(12) United States Patent
Bauza

(10) Patent No.: US 7,174,579 B1
(45) Date of Patent: Feb. 13, 2007

(54) TEMPERATURE DISPLAY SYSTEM

(76) Inventor: Pedro Bauza, 15383 SW. 42 Ter., Miami, FL (US) 33185

( * ) Notice: Subject to any disclaimer, the term of this patent is extended or adjusted under 35 U.S.C. 154(b) by 314 days.

(21) Appl. No.: 10/939,395

(22) Filed: Sep. 13, 2004

Related U.S. Application Data

(63) Continuation-in-part of application No. 10/784,094, filed on Feb. 23, 2004, now Pat. No. 7,124,452.

(51) Int. Cl.
*E03C 1/04* (2006.01)

(52) U.S. Cl. .......................................... 4/675; 374/148
(58) Field of Classification Search ............ 4/675–677; 374/147, 148; 700/32
See application file for complete search history.

(56) References Cited

U.S. PATENT DOCUMENTS 5,050,062 A * 9/1991 Hass ........................... 700/32
5,667,306 A * 9/1997 Montreuil et al. ........... 374/208
5,829,880 A * 11/1998 Diedrich .................. 374/147 X
7,090,658 B2 * 8/2006 Faries et al. ................. 604/113

* cited by examiner

*Primary Examiner*—Robert M. Fetsuga
(74) *Attorney, Agent, or Firm*—Sanchelima & Assoc., P.A.

(57) ABSTRACT

An electronic temperature display system that connects directly to a water outlet comprising a sensor coupling unit, bushing, and a display panel assembly. Microprocessor-based circuitry monitors both temperature and the presence or absence of water through the water outlet. The device displays real-time shower temperature on a self-contained unit consisting of a position adjustable display panel. A programmable temperature scorching setting provides protection from scorching by signaling an audible warning tone when the water temperature has gone passed a preset temperature. The device displays true water temperature by monitoring temperature and water conductivity inside the sensor-coupling unit.

13 Claims, 5 Drawing Sheets

TEMPERATURE DISPLAY SYSTEM

OTHER RELATED APPLICATIONS

The present application is a continuation-in-part of U.S. patent application Ser. No. 10/784,094, filed on Feb. 23, 2004, now U.S. Pat. No. 7,124,452 which is hereby incorporated by reference.

BACKGROUND OF THE INVENTION

1. Field of the Invention

The present invention relates to temperature display systems, and more particularly, to a device used to display real-time temperature of water delivered by a water outlet.

2. Description of the Related Art

Several designs for temperature control systems consist of cumbersome and expensive adaptations that require replacement of existing plumbing systems, including installation of electrical wiring. These modifications are very expensive and time consuming; furthermore, most consumers are not eager to dismantle their walls and/or wall tiles for devices that practically have no market presence or time-tested reliability. If the typical temperature control system were to fail, the user would have a second expense of having to rebuild the plumbing system back to its originality. Other temperature control systems require retrofitting devices that control a mixing chamber and mount on an outside wall, but only when the hot and cold water have a dependent valve control. These devices would not work on typical systems that have independent hot and cold controls prior to a mixing chamber.

In addition, other systems fail by displaying water temperature that is nonexistent. When water flow is not present, typical temperature sensors continue to read the internal and external temperatures of the mixing chamber, coupling, and pipes caused by heating retention of the materials. This thermo affect causes these type of systems to display a temperature, even when water is not present or being discharging through the water outlet.

Applicant believes that the closest reference corresponds to applicant's own patent application. The present application, however, includes subject matter not disclosed in the parent application.

There are no similar water temperature display systems to the best of applicant's knowledge, having a real-time temperature display that is installed directly to an existing water outlet, without modification of any in-wall plumbing system and has an adjustable LCD display panel to provide optimal viewing angles.

SUMMARY OF THE INVENTION

The present invention departs from the conventional concepts of temperature control systems, and in so doing, provides a device that is less costly and simplifies installation while providing the ideal temperature display device. This present invention provides users with precise manual control of water temperatures by displaying temperature in real time. The present invention employs a unique system that senses when water is not discharging through the water outlet. Circuitry detects the absence of water in a coupling assembly and displays a non-temperature reading in response.

More specifically, the instant invention is an electronic temperature display system for water outlets, comprising temperature sensing means having a first input connected to a water pipe and a first output generating a voltage signal as a function of temperature sensed by the first input. Computerized means have a second input connected to the first output for processing. The voltage signal generates a second output signal and display means connected to the second output signal.

Yet more specific, the instant invention is an electronic temperature display system for water outlets for a water delivery system that consist of either a dependent or independent hot and cold controls prior to a mixing chamber, comprising a sensor-coupling unit housing a temperature sensor, a bushing and a temperature display adjustable display panel assembly. The temperature display adjustable display panel assembly has a microprocessor-based circuitry with means to display real-time water temperature. The microprocessor-based circuitry communicates with the temperature sensor by means of a conducting cable. The microprocessor-based circuitry is housed within the adjustable display panel assembly. The adjustable display panel assembly further comprises a battery power source that communicates with and supplies power to the microprocessor-based circuitry. The adjustable display panel assembly further comprises a manual control interface that communicates with the microprocessor-based circuitry. The microprocessor-based circuitry monitors both water temperature and the presence or absence of water through a water outlet.

The adjustable display panel assembly further comprises a conductivity sensor. The microprocessor-based circuitry monitor signals from the temperature sensor and the conductivity sensor in order to detect actual water temperature as it flows through the water outlet.

The adjustable display panel assembly comprises audible alarm means. The microprocessor-based circuitry further comprises a programmable predetermined temperature warning set within the programmable memory storage system. The audible alarm means engage when the predetermined temperature is surpassed to provide protection from scorching.

The temperature sensor is selected from the group consisting of a thermocouple, a thermistor, a Resistance Temperature Detector (RTD), an integrated circuit temperature sensor, or a temperature-to-fluid pressure transducer.

The conducting cables are removable from the display panel housing. The battery power source is an electric battery. The electric battery is an electric dry cell battery.

The audible alarm means is selected from the group consisting of an electromechanical buzzer, a piezo transducer, or a speaker tone driver circuit.

The water outlet terminates at a showerhead. The water outlet extends from a faucet secured to a sink. The sensor-coupling unit is generally cylindrical having first and second ends. The first and second ends have first and second male threads respectively removably secured to the water outlet at a predetermined distance between the faucet and the showerhead. The bushing comprises a face, extending perpendicularly from the face are third male threads that have cooperative characteristics to receive a nut. The adjustable display panel assembly attaches to a link. The link has a first through-hole to receive the third male threads. The sink has a second through-hole to snugly receive the third threads that are tightened upon by the nut.

It is therefore one of the main objects of the present invention to provide a digital readout of water temperatures having the device directly attached to a water outlet.

It is another object of the present invention to provide a digital readout of water temperatures having an adjustable display panel.

It is yet another object of the present invention to provide a digital readout of water temperatures having its display panel be angular adjustable in order to provide the optimal viewing angle.

It is yet another object of the present invention to provide a digital readout of water temperatures having a sensor coupling be attachable to the existing water outlet.

It is yet another object of the present invention to provide a digital readout of water temperatures and monitors both temperature and the presence or absence of water through the device and the water outlet.

It is yet another object of the present invention to provide a digital readout of water temperatures having a programmable scorch temperature-warning setting.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
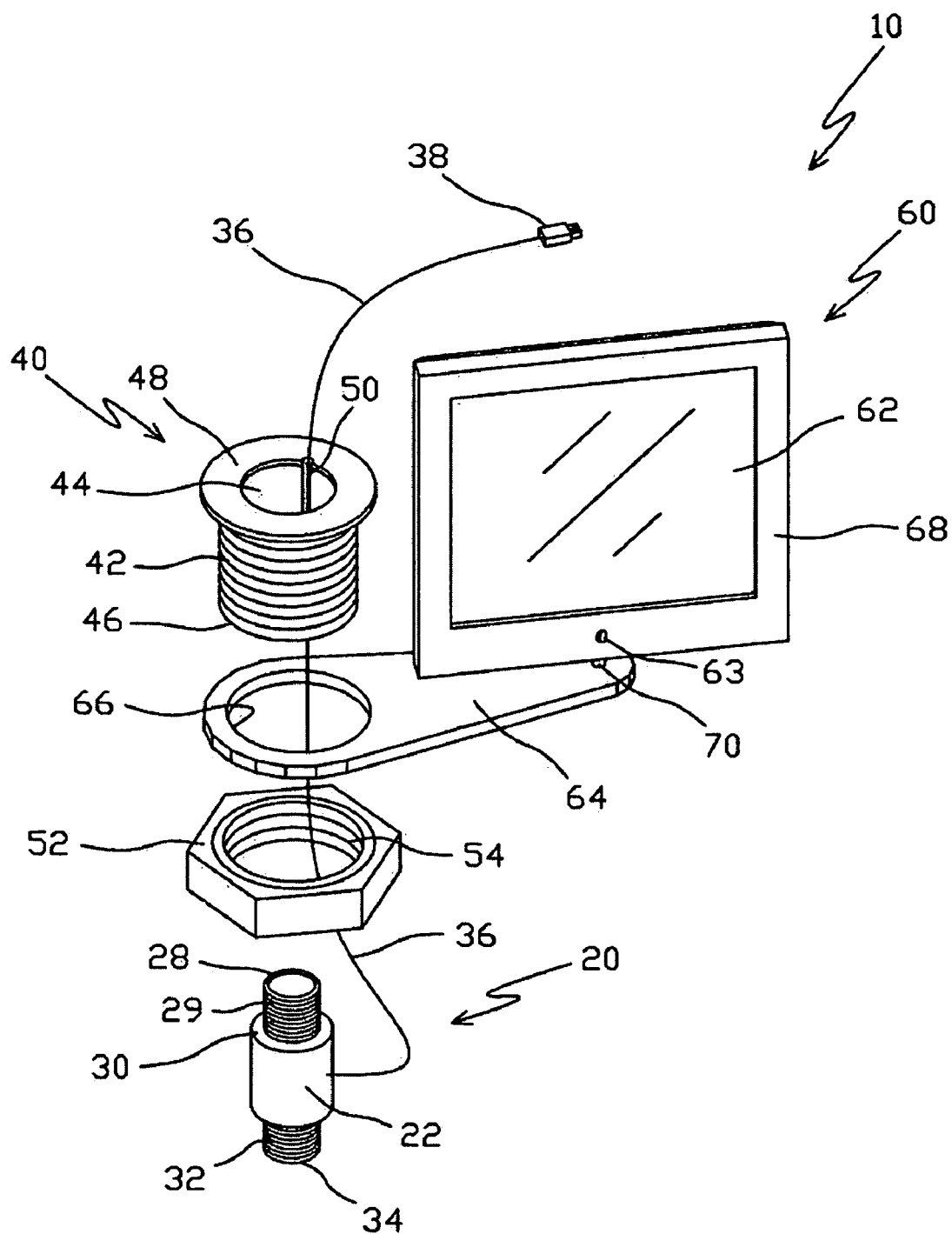
FIG. 1 represents an exploded view of the present invention.

Referring now to the drawings, where the present invention is generally referred to with numeral 10, it can be observed that it basically includes sensor-coupling unit 20, bushing 40, and display panel assembly 60.

Figure 2:
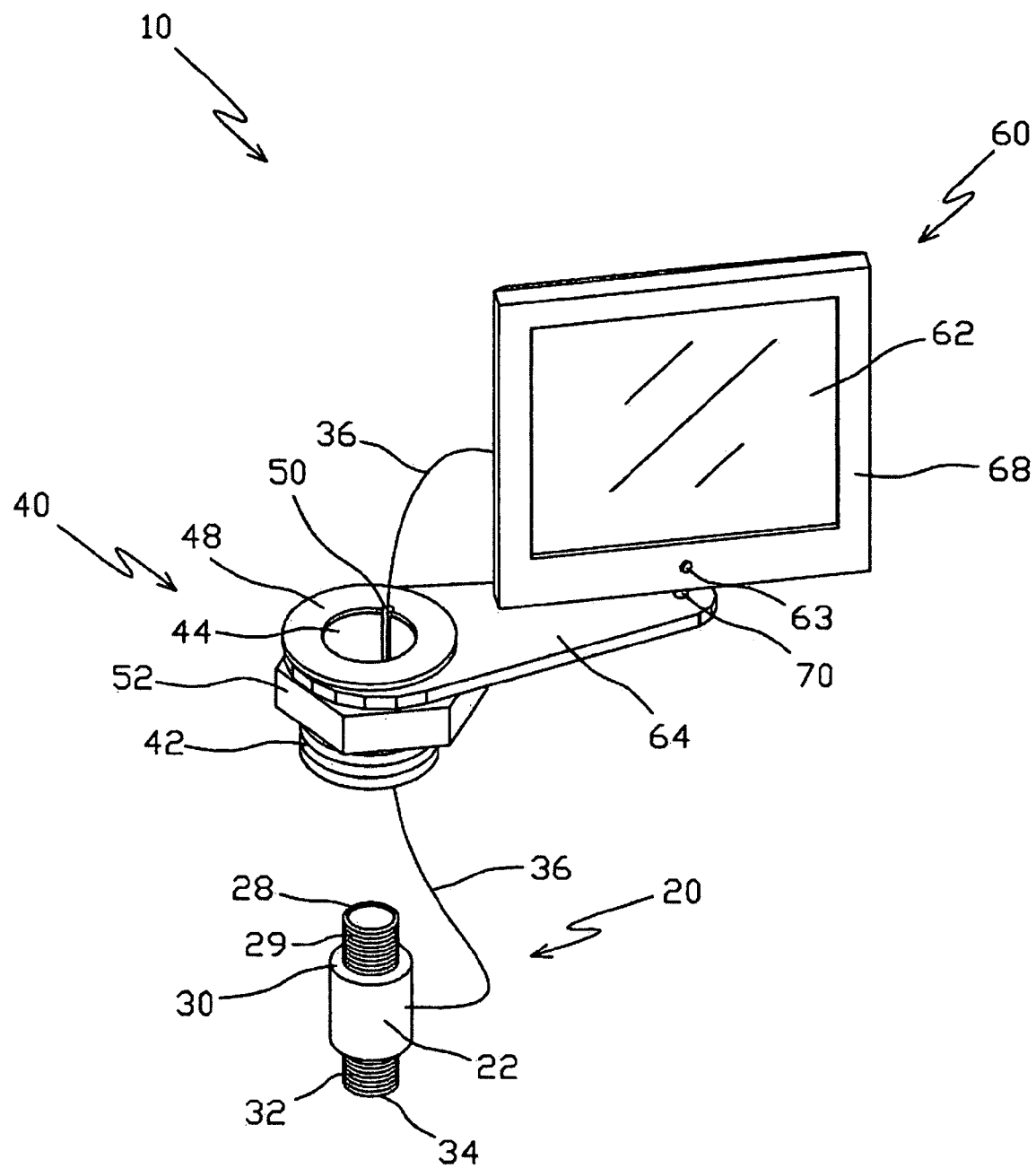
FIG. 2 shows a perspective front view of the present invention.
Figure 3:
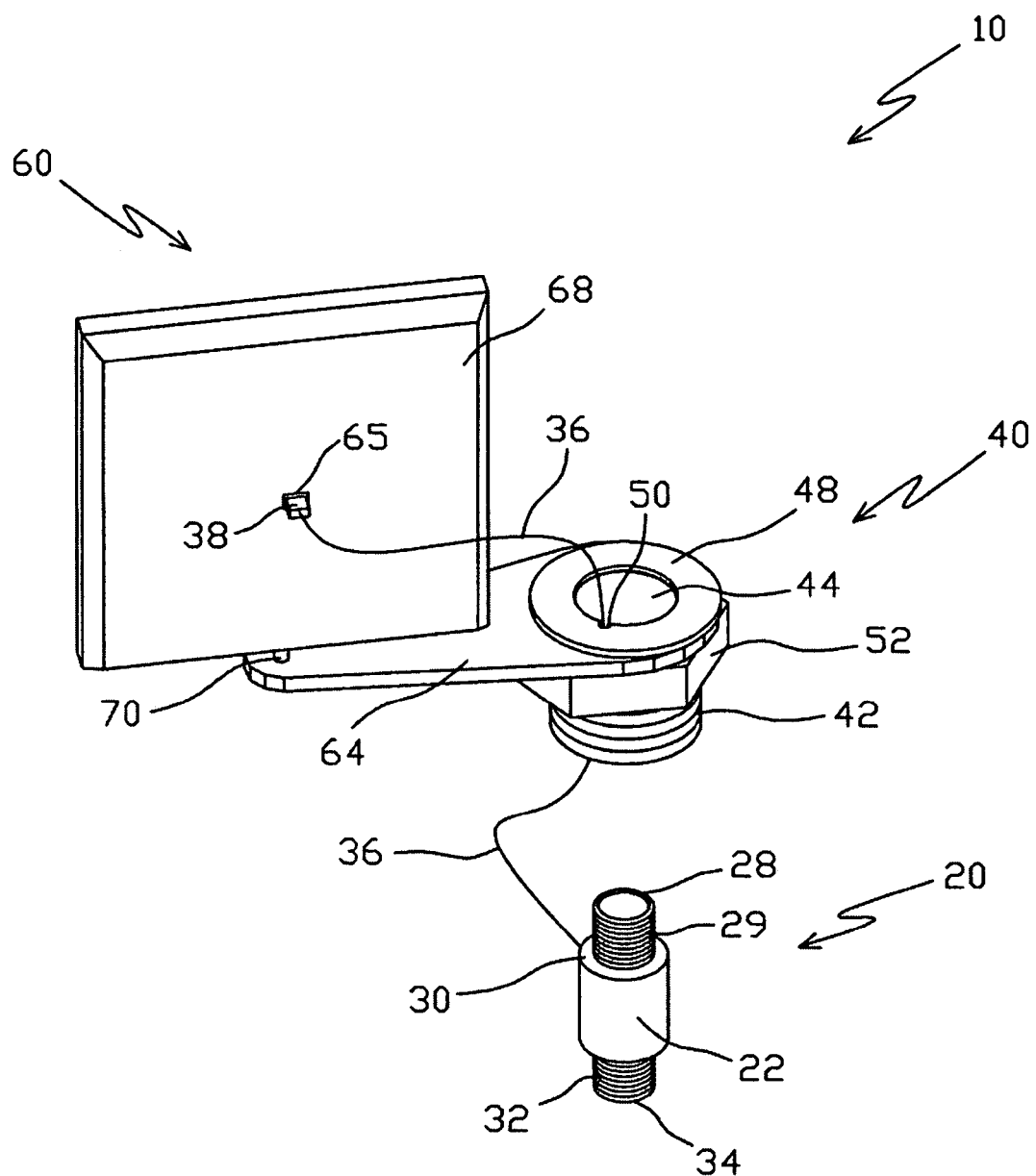
FIG. 3 shows a perspective rear view of the present invention.

As shown in FIGS. 1–3, sensor-coupling unit 20 comprises face 22. Extending from face 22 is connecting wire 36, which terminates at connector 38. Connector 38 plugs into port 65 opposite display panel 62 of display panel assembly 60. Male thread 29 outwardly extrudes from face 30 and terminates at edge 28. In the direction opposite of male thread 29, male thread 32 outwardly extrudes from a face, not seen, and terminates at edge 34.

Bushing 40 comprises face 48 and has internal wall 44 therethrough. Perpendicularly extending from face 48 are male threads 42 that terminate at edge 46. Mounted and secured onto internal wall 44 is channel 50. Channel 50 has cooperative characteristics to snugly receive connecting wire 36. Bushing 40 has cooperative characteristics to snugly fit through through-hole 66 of link 64. Nut 52 has female threads 54 that fasten upon male threads 42.

Display panel assembly 60 comprises display panel 62 secured within frame 68. Connecting frame 68 to link 64 is housing support 70. Display panel assembly 60 also has display panel 62 and button 63.

Figure 4:
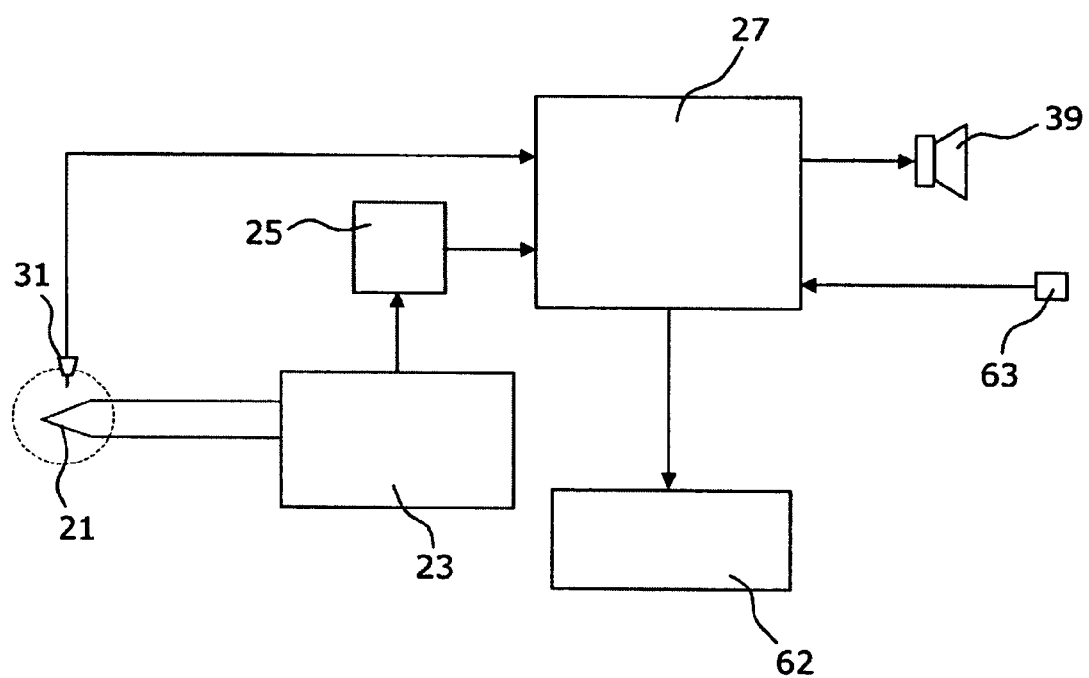
FIG. 4 is a schematic illustration of the temperature display circuit.

Referring to FIG. 4, embedded within the sensor-coupling unit 20 is a thermocouple sensor 21 in the preferred embodiment. Thermocouple sensor 21 responds to temperature changes within the sensor-coupling unit 20. The thermocouple sensor 21 generates a thermoelectric voltage in the temperature gradient that exists between a hot (junction exposed to the temperature being measured) and cold junctions. A cold-junction compensator 23 is used to develop a compensation signal, which automatically varies with the cold junction temperature in such a way to maintain the output signal constant for a constant temperature measurement.

Analog-to-digital device 25 receives the linear voltage over the range of interest and processes the signal to the microprocessor 27 to translate and display as the actual temperature reading on the display panel 62, which in the preferred embodiment is a liquid crystal display (LCD).

Also embedded within the sensor-coupling unit 20 is a conductivity sensor 31 for detecting the presence of water within the sensor-coupling unit 20. The conductivity sensor 31 consists of metal measuring electrode(s), not seen, that monitor the presence of water by one of two basic methods. One measures conductivity by a fixed voltage between electrodes so that the resulting current flow is directly proportional to the conductivity. On the other hand, the electrodes can be supplied with a current flow so that the potential between the electrodes are directly proportional to the resistance of the water, which is the reciprocal of its conductivity.

A main operation of microprocessor 27 is to monitor signals from the thermocouple sensor 21 and conductivity sensor 31 simultaneously, in order to detect actual water temperature as it discharges. When water flow ceases to discharge out the showerhead 86, seen in FIG. 5, it also ceases to be present at sensor-coupling unit 20. Therefore, by monitoring the conductivity inside the sensor-coupling unit 20, instant invention 10 can detect when water is no longer present at the showerhead 86. Microprocessor 27 commands will then halt the displaying of temperature and redirect its instructions to display a text message indicating that water is no longer present. Microprocessor 27 defining part of the microprocessor-based circuitry seen in FIG. 4, has a programmable memory storage system, not seen, used for retrieving multi-user temperature settings.

As a safety feature, a warning tone emitted from buzzer 39 alerts a user to potential scorching if the temperature has passed a preprogrammed temperature setting. This allows a user to correct the temperature safely before contacting the water. In the event that buzzer 39 is engaged, pressing button 63 may silence it. It is noted that the instant invention is powered by a battery power source such as an electric battery, which is not seen in FIG. 4 for simplicity. The electric battery may be an electric dry cell battery.

Figure 5:
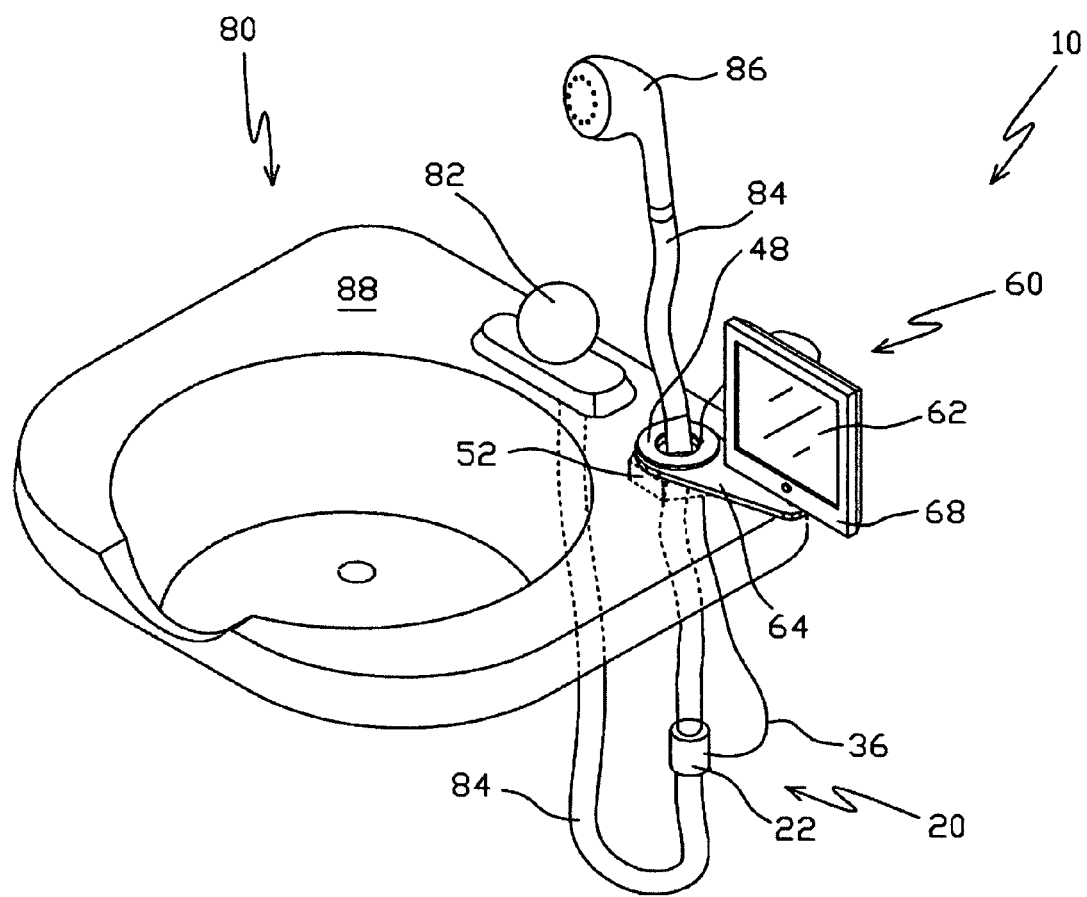
FIG. 5 is an isometric view of the present invention installed on a sink assembly.

Referring to FIG. 5 for installation, water assembly 80 comprises sink 88. Mounted onto sink 88 is faucet 82. Extending from faucet 82 is flexible pipe 84 that terminates at showerhead 86. At a predetermined distance beneath sink 88, sensor-coupling unit 20 is attached directly onto flexible pipe 84, wherein male threads 29 and 32 snugly fit within the interior diameter of flexible pipe 84 to form a watertight seal.

It is noted that sink 88 will have a through-hole, not seen to receive male threads 42 of bushing 40. Edge 46 and male threads 42 are inserted through through-hole 66 of link 64, and nut 52 is tightened upon male threads 42 until secure. Once all the units are assembled, the terminating connector 38 from the connecting wire 36 can be plugged into port 65 of display panel assembly 60. At this time the instant invention 10 can be switched on. Users have the ability to tilt and swivel the display panel 62 at any time to the desired viewing angle. The present invention's uniqueness is its straightforwardness installation process.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic temperature display system for water outlets for a water delivery system that consist of either a dependent or independent hot and cold controls prior to a mixing chamber, comprising:
   A) a sensor-coupling unit housing a temperature sensor;
   B) a bushing; and
   C) a temperature display adjustable display panel assembly having a microprocessor-based circuitry with means to display real-time water temperature, said microprocessor-based circuitry communicating with said temperature sensor by means of a conducting cable, said microprocessor-based circuitry housed within said adjustable display panel assembly, said adjustable display panel assembly further comprising a battery power source communicating with and supplying power to said microprocessor-based circuitry, said adjustable display panel assembly further comprising a manual control interface communicating with said microprocessor-based circuitry, said microprocessor-based circuitry monitors both water temperature and the presence or absence of water through a water outlet.

2. The electronic temperature display system set forth in claim 1, further characterized in that said adjustable display panel assembly further comprises a conductivity sensor, said microprocessor-based circuitry monitor signals from said temperature sensor and said conductivity sensor in order to detect actual said water temperature as it flows through said water outlet.

3. The electronic temperature display system set forth in claim 2, further characterized in that said adjustable display panel assembly comprises audible alarm means, said microprocessor-based circuitry further comprises a programmable predetermined temperature warning set within said programmable memory storage system, said audible alarm means engaging when said predetermined temperature is surpassed to provide protection from scorching.

4. The electronic temperature display system set forth in claim 3, further characterized in that said temperature sensor is selected from the group consisting of a thermocouple, a thermistor, a Resistance Temperature Detector (RTD), an integrated circuit temperature sensor, or a temperature-to-fluid pressure transducer.

5. The electronic temperature display system set forth in claim 4, further characterized in that said conducting cables are removable from said display panel housing.

6. The electronic temperature display system set forth in claim 5, further characterized in that said battery power source is a an electric battery.

7. The electronic temperature display system set forth in claim 6, further characterized in that said electric battery is an electric dry cell battery.

8. The electronic temperature display system set forth in claim 7, further characterized in that said audible alarm means is selected from the group consisting of an electromechanical buzzer, a piezo transducer, or a speaker tone driver circuit.

9. The electronic temperature display system set forth in claim 8, further characterized in that said water outlet terminates at a showerhead, said water outlet extending from a faucet secured to a sink.

10. The electronic temperature display system set forth in claim 9, further characterized in that said sensor-coupling unit is generally cylindrical having first and second ends, said first and second ends having first and second male threads respectively removably secured to said water outlet at a predetermined distance between said faucet and said shower head.

11. The electronic temperature display system set forth in claim 10, further characterized in that said bushing comprises a face, extending perpendicularly from said face are third male threads that have cooperative characteristics to receive a nut.

12. The electronic temperature display system set forth in claim 11, further characterized in that said adjustable display panel assembly attaches to a link, said link having a first through-hole to receive said third male threads.

13. The electronic temperature display system set forth in claim 12, further characterized in that said sink has a second through-hole to snugly receive said third threads that are tightened upon by said nut.

* * * * *